US010793137B2

(12) United States Patent
Boecke et al.

(10) Patent No.: US 10,793,137 B2
(45) Date of Patent: Oct. 6, 2020

(54) HIGH SPEED OPERATION OF AN ELECTRIC MACHINE

(71) Applicant: BAE Systems Controls Inc., Endicott, NY (US)

(72) Inventors: Matthew Boecke, Endicott, NY (US); Arthur Lyons, Maine, NY (US); Brian Sehn, Chenango Forks, NY (US)

(73) Assignee: BAE Systems Controls Inc., Endicott, NY (US)

( * ) Notice: Subject to any disclaimer, the term of this patent is extended or adjusted under 35 U.S.C. 154(b) by 133 days.

(21) Appl. No.: 16/210,118

(22) Filed: Dec. 5, 2018

(65) Prior Publication Data

US 2020/0180594 A1 Jun. 11, 2020

(51) Int. Cl.
*B60W 20/10* (2016.01)
*B60W 10/06* (2006.01)
(Continued)

(52) U.S. Cl.
CPC .............. *B60W 20/10* (2013.01); *B60K 6/26* (2013.01); *B60K 6/46* (2013.01); *B60L 50/12* (2019.02); *B60L 53/24* (2019.02); *B60W 10/06* (2013.01); *B60W 10/08* (2013.01); *B64D 31/00* (2013.01); *H02P 27/06* (2013.01);
(Continued)

(58) Field of Classification Search
CPC ............ B60W 20/10; B60W 2400/00; B60W 2710/06; B60W 2510/087; B60W 2710/242; B60W 2510/081; B60W 10/06; B60W 10/08; H02P 27/06; B60K 6/26; B60K 6/46; B64D 31/00; B60L 2210/30; B60L 2200/10; B60L 50/12; B60L 53/24; B60Y 2300/18125; B60Y 2200/92
See application file for complete search history.

(56) References Cited

U.S. PATENT DOCUMENTS 6,683,389 B2  1/2004 Geis
6,936,933 B2  8/2005 Wilmore
(Continued)

FOREIGN PATENT DOCUMENTS

JP  2000-166024 A  6/2000
JP  2000166024 A  6/2000
JP  2010-094016 A  4/2010
JP  2010094016 A  4/2010

OTHER PUBLICATIONS

International Search Report, PCT/US19/64391, 10 pages, dated Feb. 14, 2020.

*Primary Examiner* — Yuen Wong
(74) *Attorney, Agent, or Firm* — Scully Scott Murphy & Presser PC; Scott J. Adams (57) ABSTRACT

A hybrid electric vehicle having a controllable switch that enables a DC link to be operated independent from an energy storage system (ESS) is provided. The ESS is selectively couplable to the DC link via the controllable switch. A processor is configured to control the switch to open and close under certain conditions. When the switch is opened, the processor is configured to instruct an engine controller to cause an engine which is coupled to a generator to boost engine output. The generator is coupled to a generator inverter which is also coupled to the DC link. A motor inverter is also coupled to the DC link and is configured to provide AC power to the motor.

14 Claims, 7 Drawing Sheets

(51) Int. Cl.
    *B60W 10/08*   (2006.01)
    *B60K 6/26*    (2007.10)
    *B60K 6/46*    (2007.10)
    *B64D 31/00*   (2006.01)
    *H02P 27/06*   (2006.01)
    *B60L 50/12*   (2019.01)
    *B60L 53/24*   (2019.01)

(52) U.S. Cl.
    CPC ....... *B60L 2200/10* (2013.01); *B60L 2210/30* (2013.01); *B60W 2400/00* (2013.01); *B60W 2510/081* (2013.01); *B60W 2510/087* (2013.01); *B60W 2710/06* (2013.01); *B60W 2710/242* (2013.01); *B60Y 2200/92* (2013.01); *B60Y 2300/18125* (2013.01)

(56) References Cited

U.S. PATENT DOCUMENTS

| | | |
|---|---|---|
| 7,489,048 B2 | 2/2009 | King et al. |
| 7,586,286 B2 | 9/2009 | Cheng et al. |
| 8,062,081 B2 | 11/2011 | Barrett et al. |
| 8,120,200 B2 | 2/2012 | Walters et al. |
| 8,314,578 B2 | 11/2012 | Namuduri et al. |
| 8,606,447 B2 | 12/2013 | Namuduri et al. |
| 8,994,214 B2 | 3/2015 | Apalenek et al. |
| 2010/0109437 A1 | 5/2010 | Fattic |
| 2010/0110594 A1 | 5/2010 | Walters et al. |
| 2010/0140939 A1 | 6/2010 | Scholte-Wassink et al. |
| 2014/0244082 A1 | 8/2014 | Caron |
| 2017/0093324 A1* | 3/2017 | Saha ................... H02P 29/0241 |

\* cited by examiner

HIGH SPEED OPERATION OF AN ELECTRIC MACHINE

FIELD OF THE DISCLOSURE

This disclosure relates to hybrid electric vehicles. More specifically, this disclosure relates to systems, methods and programs for enabling high powers at high speed operation of a drive motor.

BACKGROUND

In a typical hybrid electric vehicle, a traction motor is connected to motor drive electronics, an example of which is an inverter. The inverter receives DC power from a DC link. The DC link is typically connected to at least an energy storage system. The DC link is also typically connected to generator power electronics, an example of which is another inverter. The generator power electronics are connected to a generator which in turn is connected to an internal combustion engine. In this configuration, a voltage on the DC link impacts the output which the traction motor is capable of generating.

A typical electric machine has performance characteristics including a constant torque to constant power ratio. Below a certain speed, a base speed power increases with a constant torque whereas above the base speed, power is constant and torque decreases until the motor reaches a maximum speed.

Thus, at high speeds, the tractor motor power output is limited by a voltage on the DC link.

SUMMARY

Accordingly, disclosed is a system that may increase a DC link voltage when needed without the determent of an energy storage system thereby increasing the constant torque to constant power ratio for a traction motor.

In an aspect of the disclosure, the system comprises a controllable switch that enables the DC link to be operated independent from the energy storage system.

In aspects of the disclosure, the system comprises a first inverter coupled to a generator and a DC link, an energy storage system selectively couplable to the DC link; a motor, a second inverter coupled to the DC link, a propulsion shaft coupled to the motor, a switch and a processor. The generator is mechanically couplable to an engine. The first inverter, when the generator is coupled to the engine, is configured to receive AC power from the generator and provide DC power for the DC link. The second inverter configured to receive the DC power from the first inverter and the energy storage system when coupled and provide AC power to the motor. The switch is configured to close to electrically couple the energy storage system to the DC link and open to electrically isolate the energy storage system from the DC link.

The processor is configured to control the switch to open when a required propulsion output from the motor corresponding to a requested propulsion exceeds a power available to the motor or when an output from the motor which is producible from the power available to the motor is less than the required propulsion output from the motor corresponding to the requested propulsion. When the switch is opened, the processor is configured to instruct an engine controller to cause the engine to boost engine output.

Also disclosed is a computer readable storage device having instructions, which when executed by a processor causes the processor to determining an output power required from a motor corresponding to a requested propulsion for a vehicle, determining input power available to the motor, the input power available being based at least one on a state of charge of an energy storage system, and comparing the determined input power with the determined output power required. When the determined input power is less than the determined output power required, the instructions further cause the processor to control a switch connected between the energy storage system and a DC link to open and issue a command to an engine controller to cause the engine to boost engine output. The motor is coupled to a motor inverter. The motor inverter is configured to supply the motor with AC power. The motor inverter is coupled to the DC link. The energy storage system is selectively couplable to the DC link. The engine is couplable to the generator. The generator is coupled to a generator inverter and the generator inverter is also coupled to the DC link.

Also disclosed is a computer readable storage device having instructions, which when executed by a processor causes the processor to determining an output power required from a motor corresponding to a requested propulsion for a vehicle, determining an output power from the motor which is producible from a power available to the motor, and comparing the determined output power required with the determined output power producible. When the determined output power producible is less than the output power required, the instructions further cause the processor to control a switch connected between the energy storage system and a DC link to open and issue a command to an engine controller to cause the engine to boost engine output. The motor is coupled to a motor inverter. The motor inverter is configured to supply the motor with AC power. The motor inverter is coupled to the DC link. The energy storage system is selectively couplable to the DC link. The engine is couplable to the generator. The generator is coupled to a generator inverter and the generator inverter is also coupled to the DC link.

DETAILED DESCRIPTION

The disclosed hybrid electric vehicle 1 is capable of operating electric machine at high speeds. The electric machine may be an electric motor, such as, but not limited to an inductive motor or a permanent magnet motor. The term vehicle used herein means a car, bus, taxi, vessel, airplane, train, tank, truck, or helicopter or any other moving apparatus propelled by an engine and a hybrid system. For example, aspects of the disclosure may be used in an airplane where additional power is needed for aerial maneuvers.

Figure 1:
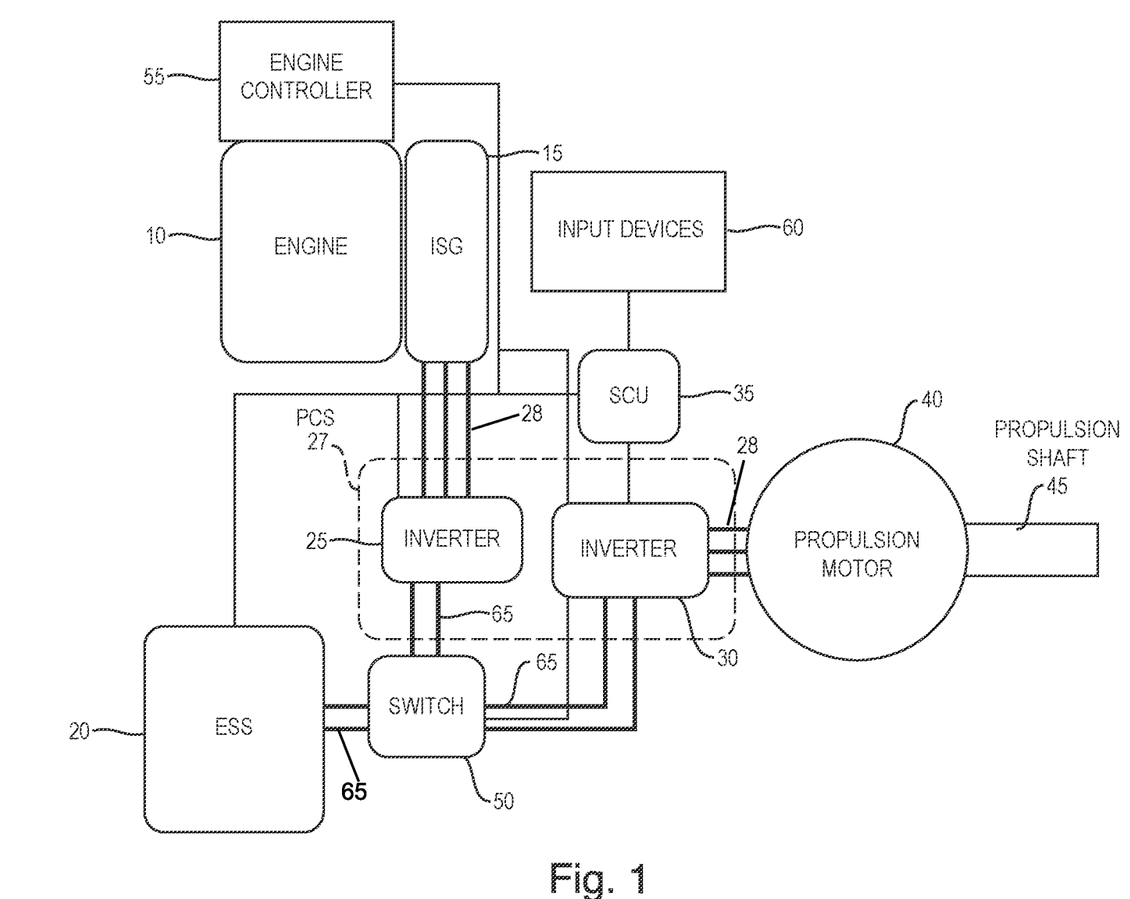
FIG. 1 illustrates a block diagram of a system for a hybrid electric vehicle in accordance with aspects of the disclosure.

FIG. 1 illustrates a block diagram of a vehicle 1 in accordance with aspects of the disclosure. The vehicle 1 is configured as a series hybrid electric vehicle. The vehicle 1 comprises an engine 10. The engine 10 (e.g., a prime mover) may be an engine that uses gasoline, a diesel engine or a compressed natural gas (CNG) engine (collectively referred to herein as "fuel"). The engine 10 comprises a crankshaft (not shown in the figures). The crankshaft rotates.

The vehicle 1 also comprises an integrated-starter generator ("ISG") 15. The ISG 15 comprises a movable shaft (also not shown in the figures).

The ISG 15 may be mounted to the engine 10 in a number of ways. For example, the moveable shaft of the ISG may be directly coupled to or mounted to the engine crankshaft. In other aspects of the disclosure, the ISG 15 may be connected via a belt/pulley system to the engine crankshaft. Alternatively, the ISG 15 may be connected to a power take off (PTO) shaft. In other aspects, the ISG 15 may be connected to a gearbox which in turn is connected to a shaft of the engine. Where a gearbox and/or belt/pulley system is used, the same provides for a fixed ratio of engine speed to an ISG speed. In an aspect of the disclosure, the speed of the engine may be different from the speed of the generator. This difference is known in advance (by the fixed speed ratio). Therefore, when one knows the speed of the generator, one also knows the speed of the engine.

The ISG 15 may be a permanent magnet generator. Other generators may be used. When coupled to the engine 10 (referred to herein as the genset), the generator provides three-phase AC electrical power. The ISG 15 may provide a variable frequency AC electrical power. The ISG 15 is a high voltage generator.

The ISG 15 is electrically coupled to the propulsion control system (PCS) 27 as indicated by the box with a dashed line. The coupling that receives three-phase AC power between the ISG 15 and the PCS 27 is indicated with three thick lines 28 (versus a thin line). The PCS 27 provides for the power processing and conversion.

The PCS 27 comprises two inverters 25 and 30. Inverter 25 is coupled to the ISG 15 and receives the three-phase AC power 28 therefrom. Since the inverter 25 is coupled to the ISG 15, the inverter is also referenced herein as the generator inverter. The generator inverter 25 converts the three-phase AC power into a DC voltage for a high voltage DC link 65. The high voltage DC link 65 is shown in the figures as two thick lines connected to the generator inverter 25 and inverter 30 (as well as the energy storage system (ESS 20)). High used herein means a voltage above 50V.

The ESS 20 provides a direct current (DC) electrical power to the same high voltage DC link 65. The ESS may include lithium ion batteries. In an aspect of the disclosure, the nominal voltage of the high voltage DC link 65 is above 600V. The power from the ISG 15 (through the inverter 25), may also recharge the ESS 20 (as well as regenerative energy recovered from the drivetrain).

The ESS 20 may also alternatively include ultra-capacitors, lead-acid batteries, and other energy storage mediums. The ultra-capacitor may include an electric double-layer capacitor (EDLC), also known as a, supercapacitor, super-condenser, or an electrochemical double layer capacitor, which has an electrochemical capacitor with relatively high energy density.

The inverter 30 is electrically connected to the ESS 20 and the inverter 25 via the high voltage DC link 65. The inverter 30 receives DC power from the inverter 25 and ESS 20 and provides a three-phase AC power. The three-phase AC power is shown in the figure as three thick lines connected to the inverter 30.

The vehicle 1 further comprises a switch 50 connected between the ESS 20 and the inverter 25, 30. The switch 50 is positioned to isolate or electrically couple the ESS 20 from/to the high voltage DC link 65. In an aspect of the disclosure, the switch 50 may be incorporated in the ESS 20. In other aspects of the disclosure, the switch 50 may be incorporated in the wires/lines connecting the ESS 20 to the PCS 27. In other aspects of the disclosure, the switch 50 may be incorporated in the PCS 27.

Advantageously, the switch 50 enables the voltage of the DC link 65 to be independent of the voltage of the ESS 20.

In an aspect of the disclosure, the switch 50 is a relay (e.g., an electrically operated switch). For example, the relay may be a contactor (for high power applications).

In an aspect of the disclosure, the switch 50 may be single pole-single throw (SPST). In one state, the switch 50 may be closed, electrically connecting the ESS 20 to the high voltage DC link 65. In another state, the switch 50 may be open, electrically isolating the ESS 20 from the high voltage DC link 55. While a SPST device has been described herein other types of switching devices may be used such as a rotary device with two states. In other aspects of the disclosure, the switches may be semiconductor based, such as a MOSFET. In other aspects of the disclosure, a mechanically operated switch may be used.

Figure 6:
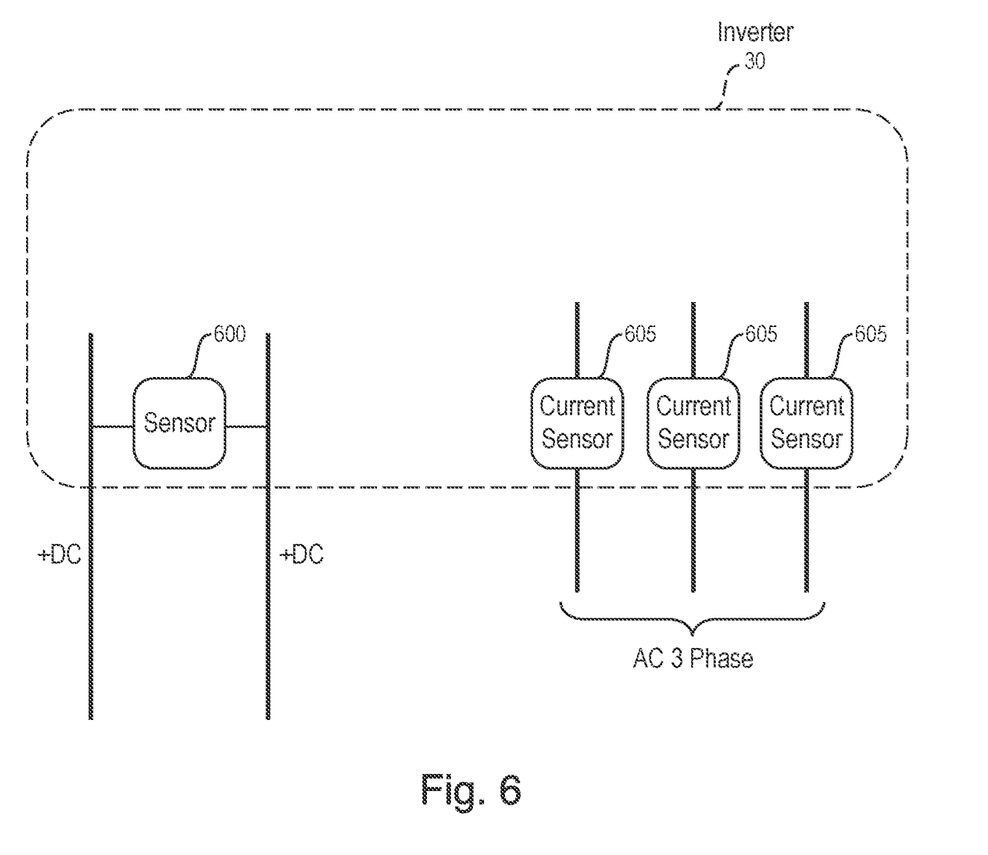
FIG. 6 illustrates a block diagram showing voltage and current sensors in an inverter in accordance with aspects of the disclosure.

The term inverter used herein not only means circuitry for transforming DC into AC or vice versa, but also include control circuitry and programs for frequency determination and duty cycle calculations to regulate the output voltage, current (e.g., power). The regulation may be based on a propulsion command. The inverter also includes sensors. For example, as shown in FIG. 6, inverter 30 comprises voltage sensors 600 and current sensors 605. In an aspect of the disclosure, a voltage sensor detects a voltage of the high voltage DC link 65. In another aspect of the disclosure, voltage sensors 600 detect the voltage of each of the three-phases output from the inverter 30. Similarly, the current sensors 605 detect the current of each of the three-phases output from the inverter 30.

The vehicle 1 further comprises a system control unit (SCU) 35. The SCU communicates with various components of the vehicle over a control area network (CAN), shown in the figures as thin communication lines. For example, the SCU 35 communicates with both inverters 25 and 30, the ESS 20, the switch 50 and a controller in the engine, e.g., engine controller 55.

The vehicle 1 may further comprises input devices 60. For example, the input devices 60 may comprise a gas pedal and brake pedal. Other types of input devices 60 may be used such as controls for a handicap person, e.g., mechanical hand controls, spinner knobs and the like. The input device is not limited to the above examples and any known user input device may be used. In other aspects of the disclosure, the input device may be a yoke or stick in an airplane. The input devices 60 are used to input requested propulsion (e.g., a propulsion request). The SCU 35 receives the requested propulsion and determines a propulsion command based thereon. A propulsion command used herein is either a torque or a speed command.

In an aspect of the disclosure, the requested propulsion is based on an angular position of the gas pedal and/or brake pedal. Where other input devices are used, the position of the same may determine the requested propulsion. In other aspects of the disclosure, the vehicle may be a self-driving vehicle and the requested propulsion may be based on one or more sensors detecting driving conditions include road type, traffic and distance to other vehicles. In other aspects of the disclosure, the requested propulsion may be triggered by an adaptive cruise control system.

The SCU 35 comprises a processor and a memory. Certain functionality of the processor will be described in detail later.

The processor may be a microcontroller or microprocessor or any other processing hardware such as a CPU or GPU. The memory may be separate from the processor (as or integrated in the same). For example, the microcontroller or microprocessor includes at least one data storage device, such as, but not limited to, RAM, ROM and persistent storage. In an aspect of the disclosure, the processor may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

As will be described later, the SCU 35 controls the state of the switch 50 based on at least the requested propulsion and a state of charge on the ESS 20.

The vehicle 1 further comprises a propulsion motor 40 (which is an example of an electric machine) and propulsion shaft 45. The propulsion motor 40 propels the vehicle 1 using the shaft 45. In an aspect of the disclosure, the propulsion motor may be an AC traction motor and used in any of the above described vehicles including marine. Like the ISG 15, motor 40 may be an induction motor, surface permanent magnet motor or an interior permanent magnet motor. The type of electric machine used may be application specific and is not limited to the examples described herein. For example, other electric machines such as axial flux, switched reluctance or air core motor(s) may be used.

The propulsion shaft 45 is directly or indirectly mechanically coupled to the vehicle axles and wheels.

Figure 2:
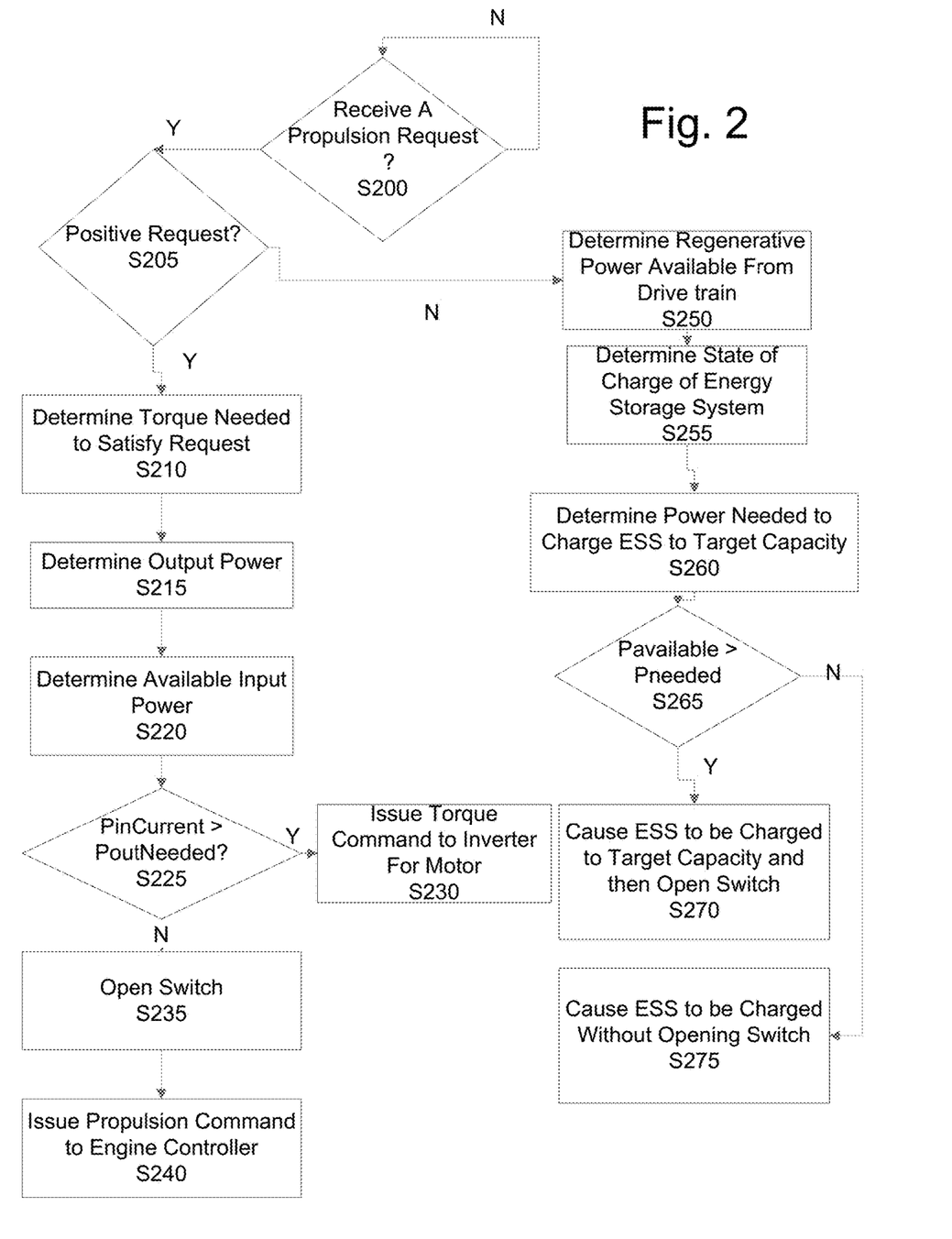
FIG. 2 illustrates a flow chart for responding to a requested propulsion in accordance with aspects of the disclosure.

FIG. 2 illustrates a flow chart for responding to requested propulsion in accordance with aspects of the disclosure.

At S200, the SCU 35 determines when it receives a propulsion request via the input devices 60. The propulsion request may be a positive request, e.g., more speed or torque, from the input device, a negative request, e.g., less speed or torque, from the input device, coasting, or braking from the brake pedal.

When the SCU 35 receives a request ("Y" at S200), the SCU 35 determines if the request is a positive request at S205. This determination may be based on a change in the angle of the gas pedal (or other input device) and detections by sensors for a self-driving vehicle or adaptive cruise control and well as the current speed/torque of the motor 40. In other aspects of the disclosure, the determination may be based on other inputs such as an odometer reading.

When the SCU 35 determines that the request is for a positive propulsion, e.g., increase speed or torque, the SCU 35 determines the torque or speed needed to satisfy the request at S210. Determining a torque or speed needed to satisfy a request is well known and will not be described herein in detail. For example, PoutNeeded (Prequested) may be determined by a position of the accelerator pedal (or other driver interfaces as described above or from vehicle sensors) and feedback provided by the operator or other systems of the vehicle. A speed of the motor is determined using a speed sensor (not shown). The discrete speed sensor may be a RPM sensor or other type of sensor. For example, the sensor may be a resolver or a hall effect sensor. The type of sensors is not limited to the above described sensors and other sensors may be used. In other aspects of the disclosure, the speed of the motor may be determined using sensorless control. The torque of the motor for a given speed is determined by the voltage of the machine and the current supplied. Machine parameters such as, but not limited to, the machine inductances, resistance, rotor diameter, number of poles, flux densities . . . and the like, determine how much torque is produced for a given Amp of current depending on the electric machine type. Additionally, other sensors may be used to determine an appropriate power such as temperature sensors, voltage and current sensors.

Figure 7:
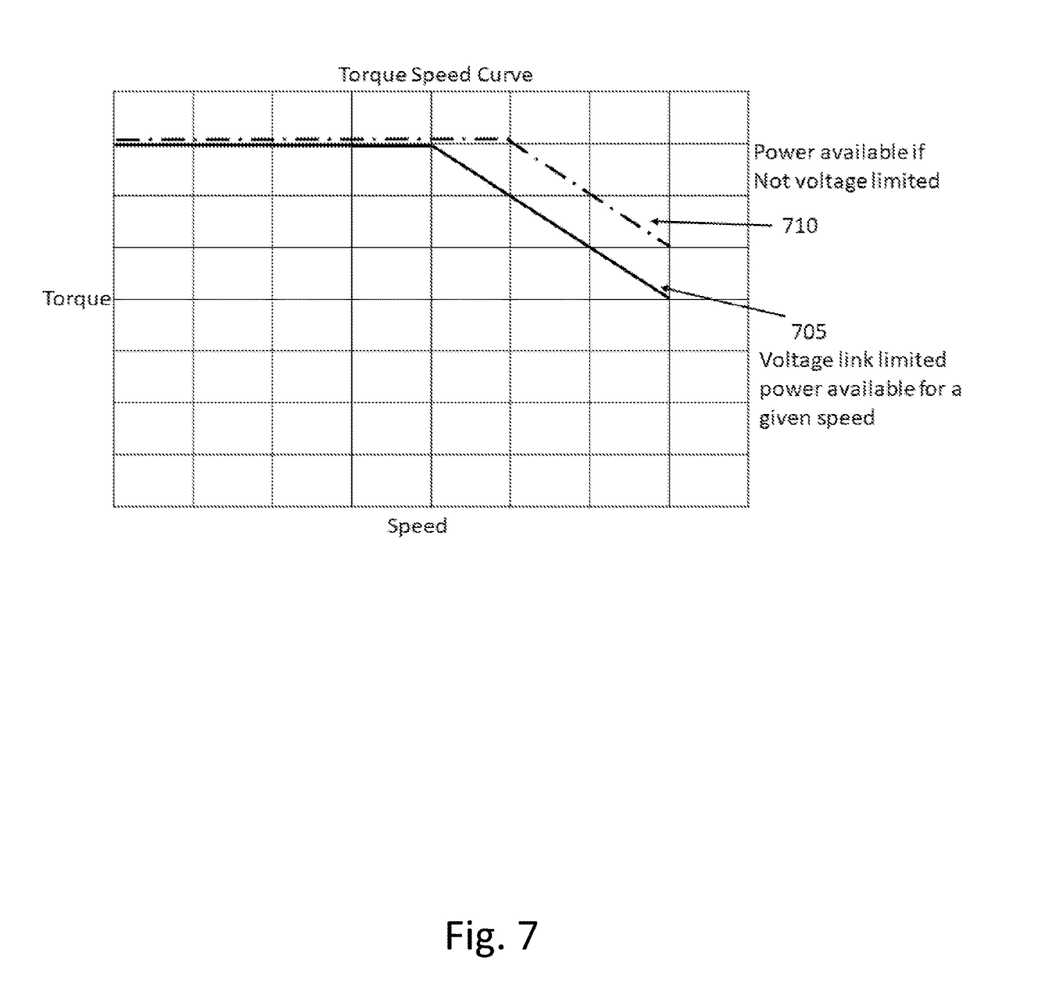
FIG. 7 illustrates a graph of a speed verses torque for (i) a voltage limited state due to the energy storage system and (ii) a switched state in accordance with aspects of the disclosure.

FIG. 7 illustrates a graph 700 of torque verses speed curves 705 and 710. The y-axis is the torque electric and the x-axis is the speed of the electric machine. Below is certain speed, the torque is constant. Above the speed, the torque decreases with an increase in speed. Curve 705 depicts a torque verses speed curve where the ESS 20 is coupled to the high voltage DC link. Thus, the voltage of the ESS 20 limits the power available for a given speed. Curve 710 depicts a torque verses speed curve where the ESS 20 is isolated from the high voltage DC link in accordance with aspects of the disclosure, e.g., power available is not limited by the ESS 20. As can be seen from the two curves 705 and 710, the curve is shifted to the right when the ESS 20 is isolated from the high voltage DC link in accordance with aspects of the disclosure. The shifting moves the speed in which the torque switches from a constant torque to a decreasing torque to a high speed. Therefore, since power is determined from equation 1 (speed times torque), higher torque is able to be produced at higher speeds (thus higher power is available).

At S215, the SCU 35 determines the output power required from the motor 40 needed for the request as described above.

The power of an electric machine (P) is determined from the following equation:

$$P = \text{Speed} * \text{Torque} \quad (1)$$

At S220, the SCU 35 determines the current power available (present power). The current power available, e.g., PinCurrent is a function of the SOC of the ESS 20 and the current limit of the system (present power). In an aspect of the disclosure, the SCU 35 monitors the SOC of the ESS 20 and determines the current voltage (present voltage) of the ESS 20, Vcurrent. The current limit, e.g., ILimit, of the system includes a current limit of the power electronics including inverter 25 and inverter 30 and well as a current limit for the motor 40. In an aspect of the disclosure a current limit of the ESS 20 may also be used. The current limit(s) is/are a preset parameter and may be stored in the memory.

The current power available (as an input) is determined from the following equation:

$$\text{PinCurrent} = V\text{current} * I\text{Limit}. \quad (2)$$

At S225, the SCU 35 determines whether the available input power (PinCurrent) is greater than the request output power, e.g. PinCurrent>PoutNeeded (also referenced as the required output power).

In this aspect of the disclosure, motor losses at the current conditions are ignored. When the PinCurrent is greater than PoutNeeded ("Y" at S225), the required output of the motor is not limited by the ESS 20. Therefore, the ESS 20 does not need to be isolated from the high voltage DC link 65. The SCU 35 issues a propulsion command, e.g., a torque or speed command, to the Inverter 30 (motor inverter) via CAN at S230.

On the other hand, when the PinCurrent is not greater than PoutNeeded ("N" at S225), the required output of the motor is limited by the ESS 20 (e.g., limited by the voltage on the high voltage DC link 65). Since the ESS 20 is coupled to the high voltage DC link 65, the voltage of the DC link 65 cannot be increased without negatively impacting the ESS 20.

Therefore, in accordance with aspects of the disclosure, the SCU 35 controls the switch 50 to open, thus isolating the ESS 20 from the high voltage DC link 65. The isolation enables the voltage of the high voltage DC link 65 to be independent from the ESS 20. When opened, the voltage of the high voltage DC link 65 may be boosted to increase the input power available to meet the demand, e.g., requested output power. This is accomplished by using the engine 10 to drive the ISG 15. The engine 10 may increase its output which in turn may increase the voltage of the DC link 65 via inverter 25.

While the switch 50 is opened, the SCU 35 issues a propulsion command to the engine controller 55 at S240. The engine satisfies all of the power requirements for the requested output power. When the engine increases the speed or torque, the ISG shaft speed in turn increases. The increase in speed of the shaft allows for higher AC power. The inverter 35 may be controlled to convert the higher AC power into a higher DC power (e.g., VcurrentEngine). The term higher here is in reference to when the switch 50 was closed. Therefore, since the voltage on the high voltage DC link 65 is increased, the PinCurrent is increased (PinCurrent now equals VcurrentEngine*ILimit).

Opening the switch 50, increases the constant torque to constant power ratio for the motor 40 by allowing a higher voltage to be able to be supplied to the motor. The voltage may be increased up to a limit of the motor.

If at S205, the SCU 35 determines that the propulsion request is not a positive torque, e.g., coasting or a negative torque, the SCU 35 determines the regenerative power available from a drive train at S250. The regenerative power available, e.g., Pavailable, is a function of the current speed of the motor and torque. As described above, the torque of the motor is determined based on a voltage of the machine and the current supplied as well as motor specific parameters. Therefore, the Pavailable may be determined by first determining how much torque is being produced for a given current (amp) for the specific electric machine, e,g., motor and then determining the speed of the motor. As described above, the speed of the motor may be determined using a discrete speed sensor or determined using sensorless control. The Pavailable is then calculated using equation 1. In other aspects of the disclosure, energy which is power that is available over a given time may also be used to determine switching. An energy determination is also based on kinetic energy of the vehicle, including altitude and mass. In this aspect of the disclosure, the expected road condition may be used, such as is the vehicle going downhill, where the amount of energy available is high.

At S255, the SCU 35 determines the current SOC of the ESS 20. As described above, the SCU 35 monitors the SOC of the ESS 20. The SOC includes both a voltage and the current. Therefore, the PSOC=Voltage*Current, which is currently detected or measured. At S260, the SCU 35 determines the power required to charge the ESS 20 to a target capacity. In an aspect of the disclosure, the target capacity is less than 100%. The power needed, Pneeded=Ptarget−PSOC, which Ptarget is the target capacity and PSOC is the current power at the state of charge. The target capacity is preset for both voltage and current and may be stored in memory.

At S265, the SCU 35 determines whether the power available for recharging the ESS is greater than the power needed, e.g., Pavailable>Pneeded.

When the power available for recharging is greater than the power needed ("Y" at S265), the ESS 20 is charged to the target capacity and the switch 50 is subsequently opened at S270. The SCU 35 issues a command to the inverter 30 to enable charging. Once charged to the target capacity, the SCU 35 controls the switch 50 to open. When the switch 50 is opened, the engine is back driven to provide braking power, e.g., the ISG 15 acts as a torsional dampener on the engine.

When the power available for recharging is not greater than the power needed ("N" at S265), the ESS 20 is charged without opening the switch at S275. The SCU 35 issues a command to the inverter 30 to enable charging.

Figure 3:
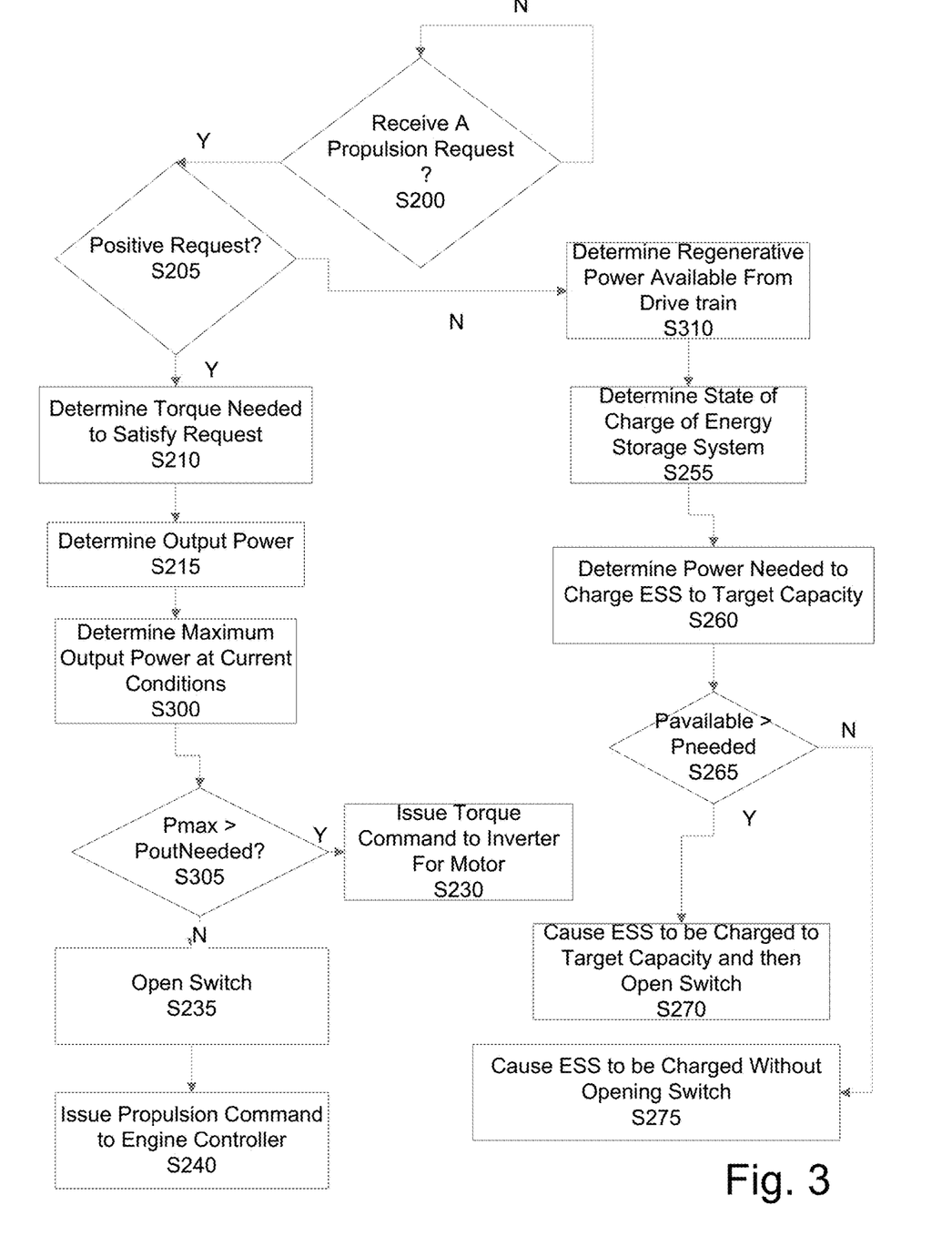
FIG. 3 illustrates a flow chart for responding to a requested propulsion in accordance with other aspects of the disclosure.

As described above, the control illustrated in FIG. 2, ignores machine losses at the operating conditions. In other aspects of the disclosure, the SCU 35 may determine when to control the switch 50 accounting for machine losses. This control is depicted in FIG. 3. Many of the features in FIG. 3 are the same as FIG. 2 except S220, S225 and S250 are replaced with S300, S305 and S310. The same features in FIG. 3 as FIG. 2 will not be described again in detail.

In FIG. 3 once the required output power (PoutNeeded) is determined in S215, the SCU 35 determines the maximum output power available at the current operating conditions (Pmax) at S300.

The maximum output power available (Pmax) is determined by the following equation:

$$P\text{max} = E * P\text{current}, \quad (3)$$

where E is an efficiency parameter and Pcurrent is the current input power available.

E is determined from the losses of the machine such an electromagnetic losses, stray losses, windage losses and parasitic losses. In equation 3, E is a value less than 1. Different types of machines, e.g., induction, permanent magnet, etc. . . . , may have different losses. The losses may include stator loss, rotor loss, core loss, friction and windage, stray load loss, pulse-width modulation (PWM) losses. These losses are known in advance for the machine.

The losses are based in part on the operating speed that the machine is running at. In an aspect of the disclosure, the memory may include a look up table having a speed based loss chart, e.g. for E. In other aspects of the disclosure, instead of having one loss parameter E, each type of loss may have its own efficiency parameter. Additionally, in other aspects of the disclosure, certain losses may be accounted for and other losses may be ignored.

In other aspects of the disclosure, the losses may also be based on temperature of the machine, e.g., motor temperature. Additionally, for an induction motor, E also accounts for voltages that are using across the various machine inductances.

Similar to above, Pcurrent is based on the SOC of the ESS 20, e.g., Vcurrent and the ILimit of the system. Therefore, since losses are not ignored in this aspect of the disclosure, the maximum output power of the machine (motor 40) (e.g., Pmax) is less than the input power available (e.g., Pcurrent).

At S305, the SCU 35 determines whether the maximum output power available (Pmax) is greater than the requested output power (PoutNeeded), e.g., Pmax>PoutNeeded. When the maximum output power available (Pmax) is greater than the requested output power (PoutNeeded) ("Y" at S305), the switch 50 is not opened and the SCU 35 issues a propulsion command to the inverter 30 to control the motor at S230. When the maximum output power available (Pmax) is not greater than the requested output power (PoutNeeded) ("N" at S305), the switch 50 is opened and the SCU 35 issues a propulsion command to the engine controller 55 at S240.

At 310, when the SCU 35 determines that the propulsion request is not a positive request ("N" at S205), the SCU 35 determines the regenerative power available, e.g., power available for charging the ESS 20. This determination is similar to described above, however, in this aspect of the disclosure, the determination also accounts for the losses including the losing described above.

Figure 4:
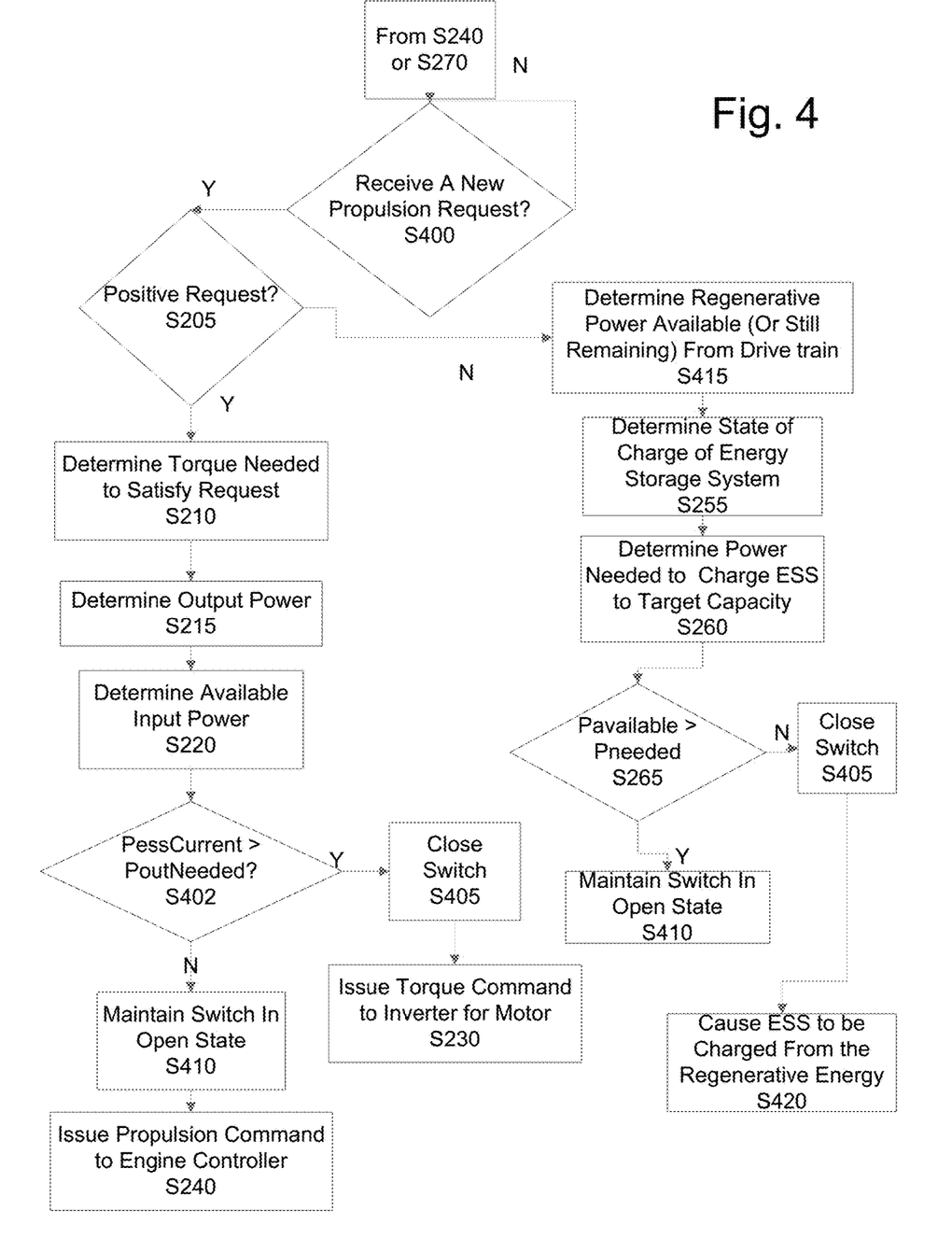
FIG. 4 illustrates a flow chart for responding to a requested propulsion when a switch is open in accordance with aspects of the disclosure.
Figure 5:
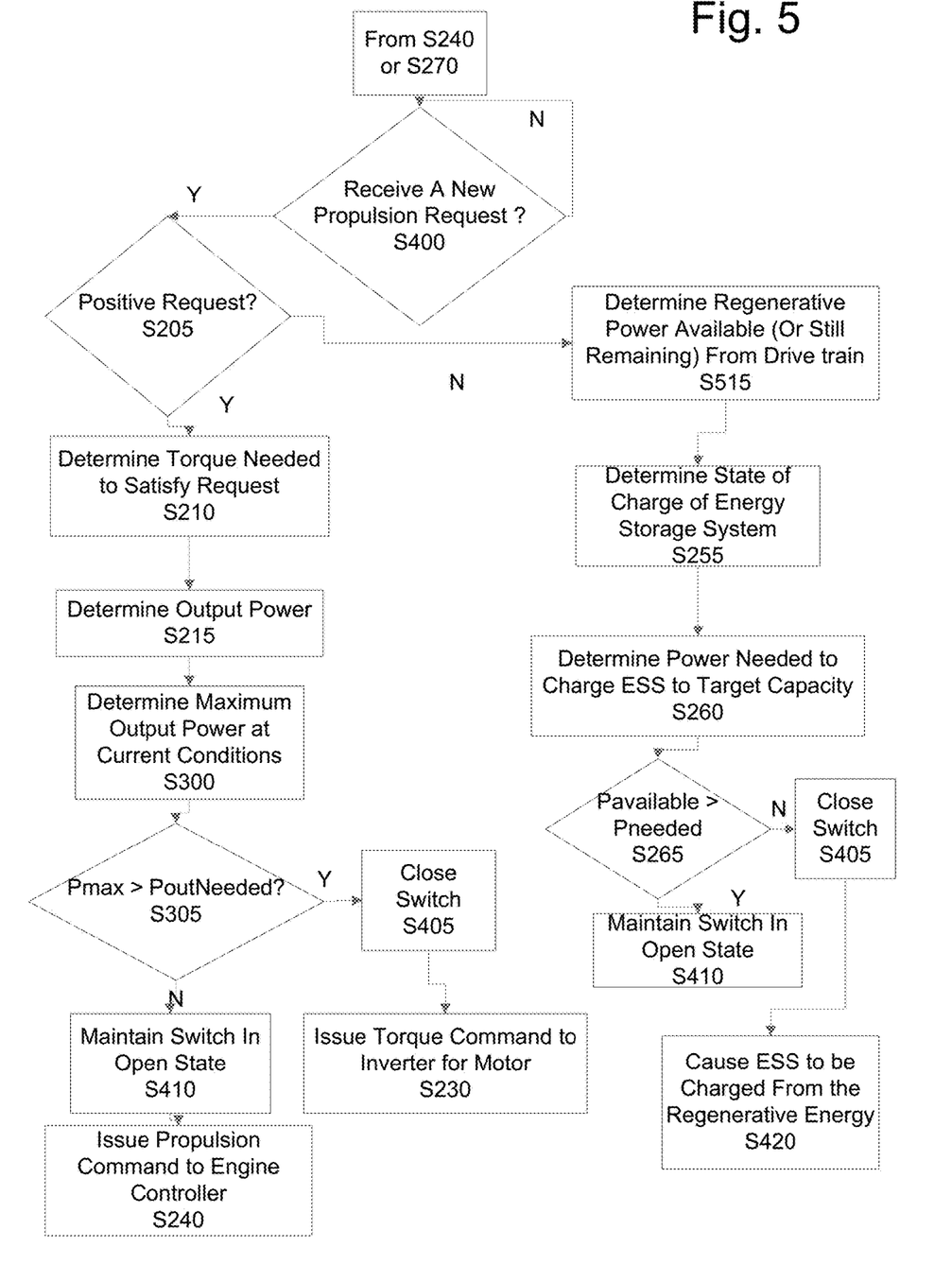
FIG. 5 illustrates a flow chart for responding to a requested propulsion when a switch is open in accordance with other aspects of the disclosure.

The SCU 35 also determines when to close the switch 50 from an opened state. FIGS. 2 and 3 describe a control when the switch 50 was closed before receiving the request for propulsion. FIGS. 4 and 5 describe a control when the switch is opened before receiving a new propulsion command (e.g., after S240 or S270).

At S400, the SCU 35 determines whether it receives a new propulsion request via the input devices 60. Once again, the propulsion request may be a positive request, e.g., more speed or torque, from the gas pedal, a negative request, e.g., less speed or torque, from the gas pedal, coasting, or braking from the brake pedal.

At S205, the SCU 35 determines whether the request is a positive propulsion request. When it is determined that the request is a positive request ("Y" at S205), the SCU 35 determines the torque or speed and power required at S210 and S215, respectively.

At S220, the SCU 35 determines the available input power from the ESS 20 from the current voltage of the ESS 20 (Vcurrent) and the current limit for the system (ILimit) (e.g., power PessCurrent).

Similar to FIG. 2, at S402, the SCU 35 compares the available input power (PessCurrent) with the required output power (PoutNeeded), e.g., PessCurrent>PoutNeeded. When the current available input power (PessCurrent) is greater than the required output power (PoutNeeded) ("Y" at S402), the switch 50 is closed at S405. The SCU 35 controls the switch 50 to close from the open state. Once closed, the SCU 35 issues a propulsion command to the inverter 30 to control the motor 40. When the current available input power (from the ESS) is not greater than the required output power ("N" at S402), the switch 50 remains open at S410. The SCU 35, if needed, issues a propulsion command to the engine controller 55 at S240.

In FIGS. 5, S220 and S402 are replaced with S300 and 305. Thus, when the maximum power available at the current operating conditions (Pmax) is greater than the required output power (PoutNeeded) ("Y" at S305), e.g., Pmax>PoutNeeded, the SCU 35 controls the switch 50 to close from the open state. When the maximum power available at the current operating conditions (Pmax) is not greater than the required output power (PoutNeeded) ("N" at S305), the switch 50 remains open at S410. The SCU 35, if needed, issues a propulsion command to the engine controller 55 at S240.

If at S205 (in FIG. 4), the SCU 35 determines that the propulsion request is not a positive torque, e.g., coasting or a negative torque, the SCU 35 determines the regenerative power available from a drive train or still remaining if coasting at S415. The regenerative power available, e.g., Pavailable, is a function of the current speed of the motor and torque. The determination of the available power was described above and will not be described again in detail. The SCU 35 determines the SOC of the ESS and power needed to charge the ESS to the target capacity at S255 and S260, respectively.

At S265, the SCU 35 determines whether the power available (Pavailable) is greater than the power needed to charge (Pneeded), e.g., Pavailable>Pneeded. When the power available (Pavailable) is greater than the power needed to charge (Pneeded) ("Y" at S265), the switch 50 is maintained in an open state. In this aspect of the disclosure, if the switch was opened, it is assumed that the ESS is already charged to the target capacity.

When the power available (Pavailable) is not greater than the power needed to charge (Pneeded) ("N" at S265), the switch 50 is closed. The SCU 35 controls the switch 50 to close from an opened state at S405. The SCU 35 subsequently issues a command via CAN to the inverter 30 to cause the ESS 20 to be charged from the available power at S420.

The regenerative control in FIG. 5 is similar to FIG. 4, except that in S515, the SCU 35 accounts for losses whereas in S415, the losses are ignored.

While FIG. 1 illustrates a series hybrid configuration, other hybrid configurations may be used such as compound turbo parallel configuration where a turbo generator may be used to provide additional power which is used for motoring. Like the ISG 15, the turbo generator is coupled to an electric machine (generator) which in turn is coupled to the dual inverter system (such as PCS 27) and the ESS 20. The turbo that is connected to the generator uses pressure to provide mechanical power to the electric generator (e.g., ISG) which in turn produces AC power. As described above, the dual inverter system has a high voltage DC link connecting the inverters. The high voltage DC link is also connected to the ESS in a similar manner as described above. Thus, the output of the turbo generator is similarly limited based on a voltage of the DC link. Additional power is available when the ESS 20 is isolated from the DC link.

The functionality described herein for the SCUs is executed by a processor in the same. As used herein, in addition to described above, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by the SCUs, may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for a hybrid electric vehicle comprising:
    a first inverter coupled to a generator, where the generator is mechanically couplable to an engine, the first inverter, when the generator is coupled to the engine, is configured to receive AC power from the generator and provide DC power for a DC link;
    an energy storage system selectively couplable to the DC link;
    a motor;
    a second inverter coupled to the DC link and configured to receive the DC power from the first inverter and the energy storage system when coupled and provide AC power to the motor;
    a propulsion shaft coupled to the motor;
    a switch configured to close to electrically couple the energy storage system to the DC link and open to electrically isolate the energy storage system from the DC link;
    a processor configured to control the switch to open when a required propulsion output from the motor corresponding to a requested propulsion exceeds a power available to the motor or when an output from the motor which is producible from the power available to the motor is less than the required propulsion output from the motor corresponding to the requested propulsion,
    wherein when the switch is opened, the processor is configured to instruct an engine controller to cause the engine to boost engine output.

2. The system according to claim 1, wherein when the switch is opened and when the engine output is boost, a voltage of the DC link increases independently from the energy storage system.

3. The system according to claim 1, wherein the power available to the motor is based on a state of charge of the energy storage system and a current limit of the system.

4. The system according to claim 1, wherein the motor is a type of motor selected from an induction motor and a permanent magnetic motor.

5. The system of claim 4, wherein the output from the motor which is producible from the power available to the motor is based on current operating conditions of the motor and losses, the current operating conditions comprising a motor temperature and motor speed.

6. The system of claim 5, wherein the output from the motor which is producible from the power available to the motor is further based on the type of motor.

7. The system according to claim 1, wherein the processor is configured to control the switch to open when energy recovered from regenerative braking exceeds a power level.

8. The system according to claim 7, wherein the power level is based on a current state of charge of the energy storage system.

9. The system according to claim 7, wherein the generator is a torsional dampener on the engine during regenerative braking.

10. The system according to claim 1, wherein the hybrid electric vehicle is an aircraft.

11. The system according to claim 1 wherein the hybrid electric vehicle is configured as a series hybrid electric system.

12. The system of claim 3, wherein the processor is configured to close the switch, after the switch is opened, when the required propulsion output from the motor corresponding to the requested propulsion is equal to or less than the power available to the motor based on an state of charge of the energy storage system or when the output from the motor which is producible from the power available to the motor based on the state of charge of the energy storage system is greater than or equal to the required propulsion output from the motor corresponding to the requested propulsion.

13. A non-transitory computer readable storage device having instructions, which when executed by a processor, cause the processor to execute:
    determining an output power required from a motor corresponding to a requested propulsion for a vehicle, the motor being coupled to a motor inverter configured to supply the motor with AC power, where the motor inverter is coupled to a DC link;

determining input power available to the motor, the input power available being based at least one on a state of charge of an energy storage system, the energy storage system being selectively couplable to the DC link;

comparing the determine input power with the determined output power required;

when the determined input power is less than the determined output power required,     controlling a switch connected between the energy storage system and the DC link to open to electrically isolate the energy storage system from the DC link; and     issuing a command to an engine controller to cause an engine, couplable to a generator, to boast engine output, where the generator is coupled to a generator inverter and the generator inverter is coupled to the DC link.

14. A non-transitory computer readable storage device having instructions, which when executed by a processor, cause the processor to execute:

determining an output power required from a motor corresponding to a requested propulsion for a vehicle, the motor being coupled to a motor inverter configured to supply the motor with AC power, where the motor inverter is coupled to a DC link;

determining an output power from the motor which is producible from a power available to the motor;

comparing the determined output power required with the determined output power producible;

when the determined output power producible is less than the output power required,     controlling a switch connected between an energy storage system and the DC link to open to electrically isolate the energy storage system from the DC link; and     issuing a command to an engine controller to cause an engine, couplable to a generator, to boast engine output, where the generator is coupled to a generator inverter and the generator inverter is coupled to the DC link.

\* \* \* \* \*